United States Patent [19]

Fait et al.

[11] Patent Number: 4,840,289
[45] Date of Patent: Jun. 20, 1989

[54] SPIN-BONDED ALL PLASTIC CAN AND METHOD OF FORMING SAME

[75] Inventors: Roger J. Fait, Ballwin; Donald H. Ellerbrock, Florissant, both of Mo.

[73] Assignee: Sonoco Products Company, Hartsville, S.C.

[21] Appl. No.: 188,445

[22] Filed: Apr. 29, 1988

[51] Int. Cl.$^4$ .................. B65D 41/00; B65D 13/00
[52] U.S. Cl. .................................. 220/359; 220/67; 220/276; 215/232
[58] Field of Search ............. 220/67, 359, 363, 276, 220/DIG. 31; 215/232

[56] References Cited

U.S. PATENT DOCUMENTS

| | | | |
|---|---|---|---|
| 3,341,059 | 9/1967 | Schild | 220/67 |
| 4,075,820 | 2/1978 | Standley | 215/232 |
| 4,548,333 | 10/1985 | Kobayashi | 220/276 |
| 4,606,470 | 8/1986 | Barlics | 215/232 |
| 4,667,842 | 5/1987 | Collins | 220/359 |
| 4,762,249 | 8/1988 | Fortuna | 220/359 |

*Primary Examiner*—Jimmy G. Foster
*Assistant Examiner*—Gril W. Reece
*Attorney, Agent, or Firm*—Bell, Seltzer, Park & Gibson

[57] ABSTRACT

The all plastic can includes an upwardly extending open mouth portion with an inwardly tapering exterior surface and a molded plastic end closure member having an integrally formed rim portion extending downwardly therefrom. An outwardly tapering interior surface is provided on the rim and is inclined to mate with the inwardly tapering exterior surface of the open mouth portion of the can body. Relative rotation is imparted between the end closure member and the product filled can body so that spin-bond sealing connects the inwardly tapering exterior surface of the open mouth portion and the interior surface of the rim portion of the end closure member. An intergrally formed outwardly extending rib is provided on the inwardly tapering exterior surface of the open mouth portion to enhance the spin-bond between the end closure member and the can body. A bead of hot melt material is applied around the upper portion of the inwardly tapering exterior surface of the open mouth portion and serves to prevent entry into the interior of the product filled can body of any plastic dust particles generated by the spin-bonding of the end closure member to the can body. The spin-bonding of the end closure member provides a tamper evident closure for the can.

7 Claims, 2 Drawing Sheets

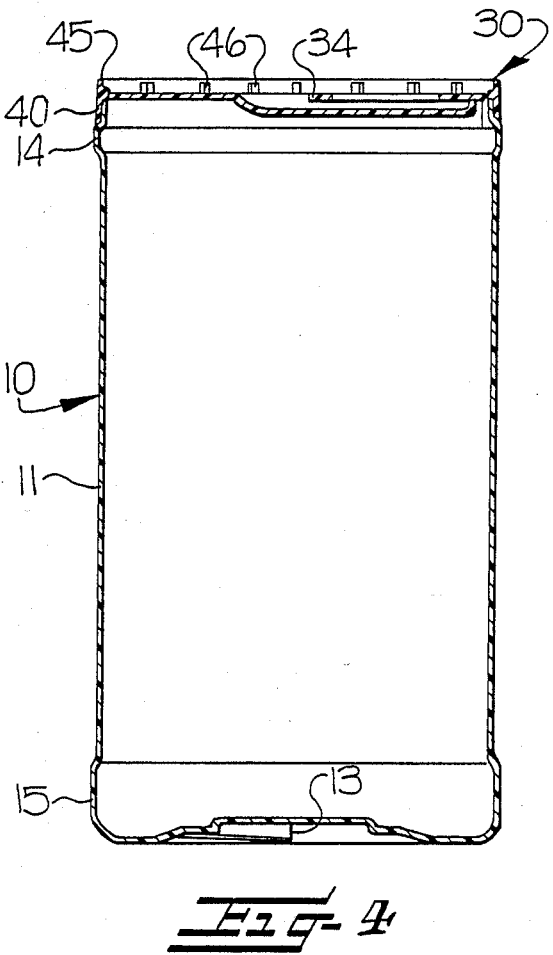
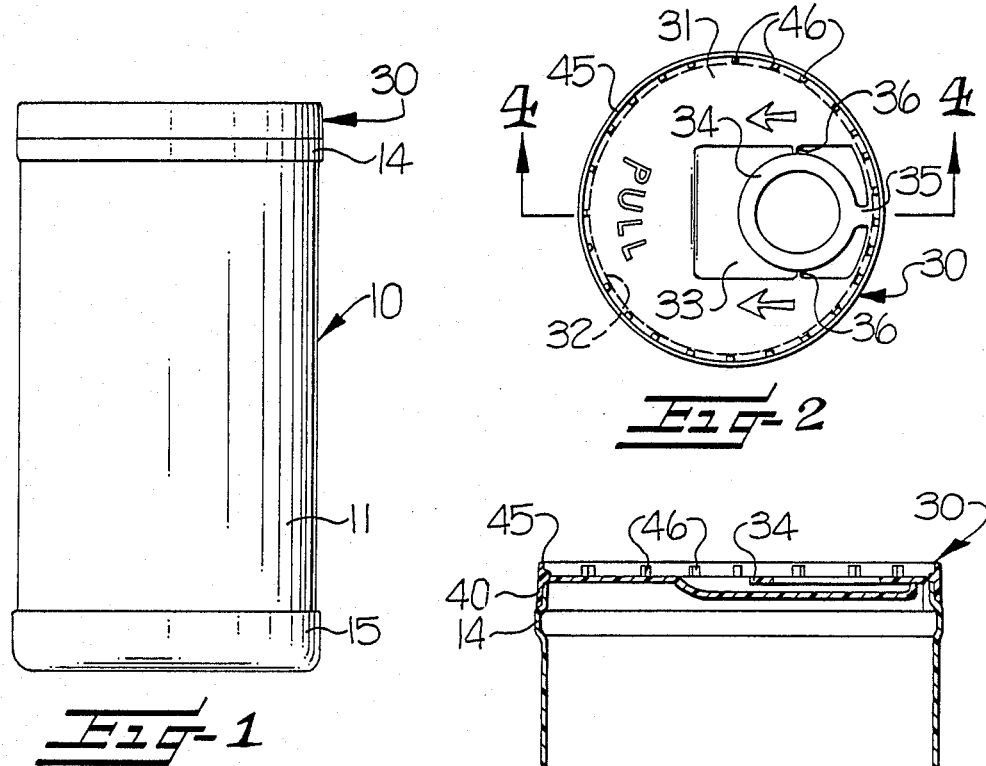
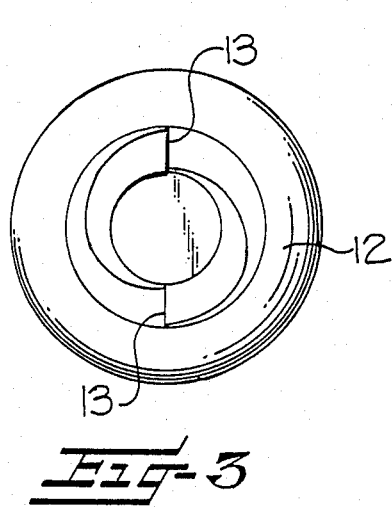

SPIN-BONDED ALL PLASTIC CAN AND METHOD OF FORMING SAME

FIELD OF THE INVENTION

This invention relates generally to a spin-bonded all plastic can and method of forming the same, and more particularly to such a can for storing various types of beverages, frozen juice concentrates, and the like, and includes a molded plastic end closure member including a depending rim spin-bonded to an inwardly tapering exterior surface of an upper open mouth portion of a product filled molded can body.

BACKGROUND OF THE INVENTION

It is generally known to form an all plastic can including a molded cylindrical body and a molded end closure with a circular score line or tear groove and a pull tab or ring for easily removing substantially the entire top of the can. This type of all plastic can is disclosed in U.S. Pat. No. 4,171,062 and includes a closure band or skirt integrally molded with the can body and engaging and surrounding a peripheral portion of the end closure to maintain the end closure secured to the can body. However, the closure band or skirt extends outwardly around the upper end of the can and can be taken apart, the product tampered with, and the end closure can then be reclosed or refitted without any physical evidence that tampering has occurred.

Also, it is generally known, as disclosed in U.S. Pat. No. 4,402,451, to spin-bond a molded plastic end closure member to a composite can body of the type which includes a plastic inner liner. Spin-bonding, or frictional welding, of a plastic end closure member to the plastic side wall of a plastic bottle is disclosed in U.S. Pat. No. 3,712,497. However, the methods of spin-bonding disclosed in these patents are not adaptable for attaching a molded plastic end closure member to a product filled molded plastic can body. In these prior art containers, the product is placed in the container after the spin-bonding has taken place so that any plastic dust or particles, deposited in the container by the spin-bonding process, can be removed before the product is placed in the container.

SUMMARY OF THE INVENTION

With the foregoing in mind, it is an object of the present invention to provide a spin-bonded all plastic can and method of forming the same in which the molded plastic end closure member is spin-bonded to the open mouth portion of a product filled plastic can body to provide a tamper evident closure for the can.

In accordance with the present invention, the molded plastic can body is provided with an open mouth portion having an inwardly tapering exterior surface extending upwardly from the cylindrical side wall portion. The molded plastic end closure member includes a circular center panel portion closing the upper end of the can body and an integrally formed rim portion extending downwardly from the peripheral portion of the circular center panel. The rim portion includes an outwardly tapering interior surface inclined to mate with the inwardly tapering exterior surface of the open mouth portion of the can body. The mating surfaces of the inwardly tapering exterior surface of the open mouth portion and the outwardly tapering interior surface of the rim portion are spin-bonded together to sealingly connect and secure the molded plastic end closure member to the molded plastic can body.

The inwardly tapering exterior surface of the open mouth portion of the can body and the mating outwardly tapering interior surface of the rim of the end closure member extend at an angle of about ten degrees relative to the cylindrical side wall portion of the can body. It is preferred that the inwardly tapering exterior surface of the open mouth portion of the can body be provided with an integrally formed outwardly extending rib adapted to be first engaged by the outwardly tapering interior surface of the rim portion of the end closure member so that spinning frictional engagement between the interior surface of the rim and the exterior surface of the open mouth portion creates sufficient heat to soften and bond or fuse the contiguous thermoplastic materials together.

When the present all plastic can is utilized to store certain types of products, such as frozen juice concentrates, it is preferred that a bead of hot melt material be applied around and adjacent the upper portion of the inwardly tapering exterior surface of the open mouth portion so as to prevent entry into the interior of the can body by any plastic dust or particles which may be generated by the spin-bonding of the plastic end closure member onto the open mouth portion of the plastic can body. The bead of hot melt material is preferably positioned around and above the rib extending outwardly from the central portion of the inwardly tapering exterior surface of the open mouth portion so that any plastic dust or particles generated by the spin-bonding process will not move upwardly and into the interior of the can body. The upper and lower end portions of the cylindrical side wall of the can body are provided with respective upper and lower outwardly extending bumper ribs to define a recessed exterior side wall surface on the central portion of the can body to which a label, printing, or other identifying indicia may be applied. The upper and lower bumper ribs serve to engage corresponding upper and lower bumper ribs formed on adjacent cans packed in cases for shipment or the like. These upper and lower bumper ribs serve to prevent engagement and damage of the identifying indicia on adjacent plastic cans. The bumper ribs also serve to prevent damage to or rupture of a frangible score line provided around the peripheral edge portion of the plastic end closure member.

BRIEF DESCRIPTION OF THE DRAWINGS

Other objects and advantages will appear as the description proceeds when taken in connection with the accompanying drawings, in which FIG. 1 is a side elevational view of the all plastic can of the present invention;

FIG. 2 is a top plan view of the all plastic can shown in FIG. 1;

FIG. 3 is a bottom plan view of the all plastic can shown in FIG. 1;

FIG. 4 is an enlarged vertical sectional view taken substantially along the line 4—4 in FIG. 2;

DESCRIPTION OF THE PREFERRED EMBODIMENTS

Figure 5:
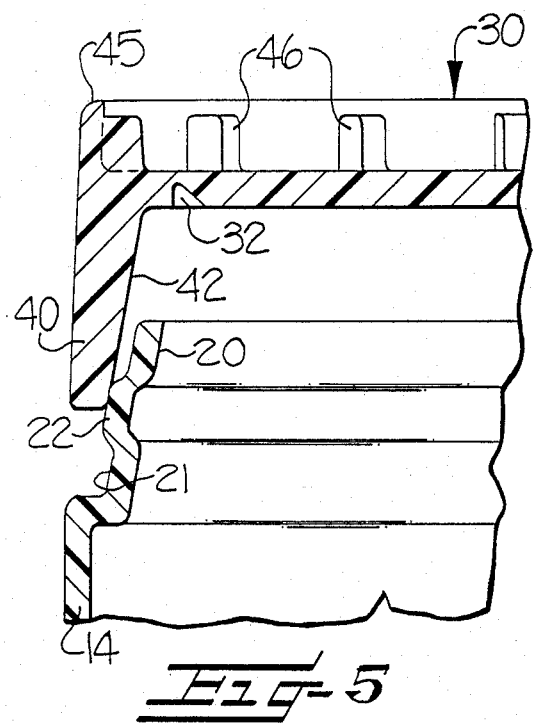
FIG. 5 is a greatly enlarged fragmentary sectional view of the upper left-hand portion of the can illustrated in FIG. 4 and with the molded plastic end closure member aligned with and positioned above the inwardly tapering exterior surface of the open mouth portion of the molded plastic can body.

The thermoplastic synthetic all plastic can of the present invention includes a molded plastic can body, broadly indicated at 10, and including a cylindrical side wall portion 11 and an integrally formed closed bottom 12. The closed bottom 12 is provided with diametrically opposed and vertically extending molded stops 13, for purposes to be presently described. Respective upper and lower outwardly extending bumper ribs 14, 15 are provided on the corresponding upper and lower end portions of the cylindrical side wall 11. The upper and lower bumper ribs 14, 15 are preferably integrally molded with the side wall 11 and the bottom 12 and define a recessed exterior surface on the side wall 11 to which a suitable label, printing, or other identifying indicia may be applied. The upper and lower bumper ribs 14, 15 serve to engage corresponding upper and lower bumper ribs formed on adjacent cans packed in cases for shipment or the like and also serve to prevent engagement and damage of the identifying indicia on adjacent cans.

An open mouth portion 20 is integrally molded with and extends upwardly from the upper bumper rib 14 on the cylindrical side wall 11 and includes an inwardly tapering exterior surface 21. The inwardly tapering exterior surface 21 extends inwardly at an angle of from about five to fifteen degrees. The inwardly tapering exterior surface 21 is preferably inclined inwardly at an angle of ten degrees, relative to the cylindrical side wall 11, as shown in FIGS. 5-8. The inwardly tapering exterior surface 21 of the open mouth portion 20 includes an integrally formed outwardly extending rib 22, for purposes to be presently described. As illustrated in FIG. 5, the rib 22 surrounds the medial portion of the open mouth portion 20 and covers about one-third of the length of the inwardly tapering exterior surface 21.

A molded plastic end closure member, broadly indicated at 30, is provided to sealingly close the upper end of the can body 10. The end closure member 30 includes a circular center panel portion 31 with a circular frangible score line or tear groove 32 (FIGS. 5-8) extending around the peripheral edge of the center panel 31 and partially penetrating the lower surface of the circular center panel 31. As illustrated in FIG. 4, the circular center panel 31 is provided with an indented recess panel 33 for accommodating an integrally molded pull tab or ring 34. One side edge of the pull tab 34 is integrally molded with the central panel 31, as by a connector member 35, and opposite side edges of the pull tab 34 are connected to the opposite sides of the recess panel 33 by molded connector members 36 (FIG. 2). The pull tab 34 is positioned in the indented panel 33 to be manually raised by pulling up on the center portion thereof to rupture the adjacent portion of the circular score line 32 so that the entire center panel 31 may be easily removed to provide a full opening in the upper end of the can. The upper and lower bumper ribs 14, 15 surrounding the can body 10 aid in preventing damage to or accidental rupture of the frangible score line 32 of the plastic end closure member 30.

The outer peripheral portion of the end closure member 30 is provided with an integrally formed rim portion 40 extending downwardly therefrom and including an outwardly tapering interior surface 42 (FIG. 5) which is inclined outwardly at an angle of about five to fifteen degrees. The outwardly tapering interior surface 42 is preferably inclined outwardly at an angle of ten degrees, relative to the outer surface of the cylindrical side wall 11, as shown in FIGS. 5-8. It is preferred that the outwardly inclined tapering interior surface 42 mate with the inwardly tapering interior surface 21 of the open mouth portion 20 of the can body 10. The peripheral edge of the end closure member 30 is also provided with an integrally molded and upstanding rib or rim 45 (FIG. 5) and inwardly extending spaced-apart rotating lugs 46, for purposes to be presently described.

As a specific but nonlimiting example, it has been found that a satisfactory all plastic can can be produced for storage and marketing of frozen orange juice concentrate by blow molding the can body 10 from a high density polyethylene (HDPE) parison. The blow molded can body 10 includes cylindrical side wall portion 11, bottom 12, upper and lower bumper ribs 14, 15, and open mouth inwardly tapering portion 20. The plastic end closure member 30 is injection molded with a low density polyethylene (LDPE) material.

Figure 6:
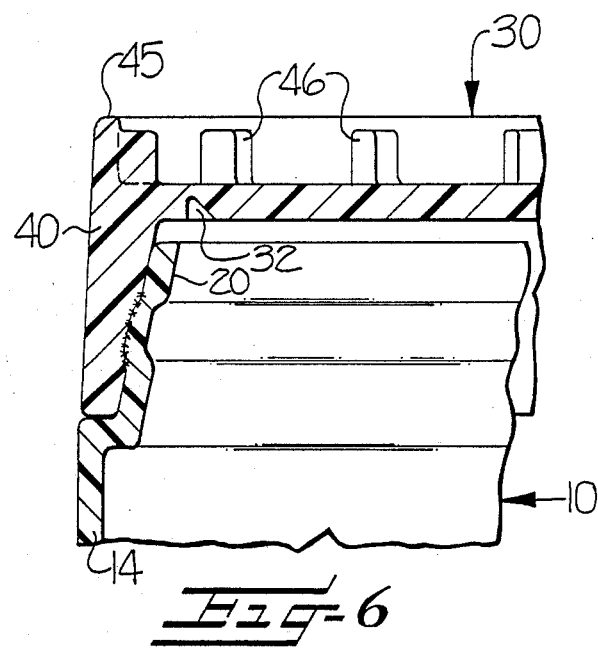
FIG. 6 is a view similar to FIG. 5 but showing the molded plastic end closure member being lowered onto and spin-bonded to the mouth portion of the can body.
Figure 7:
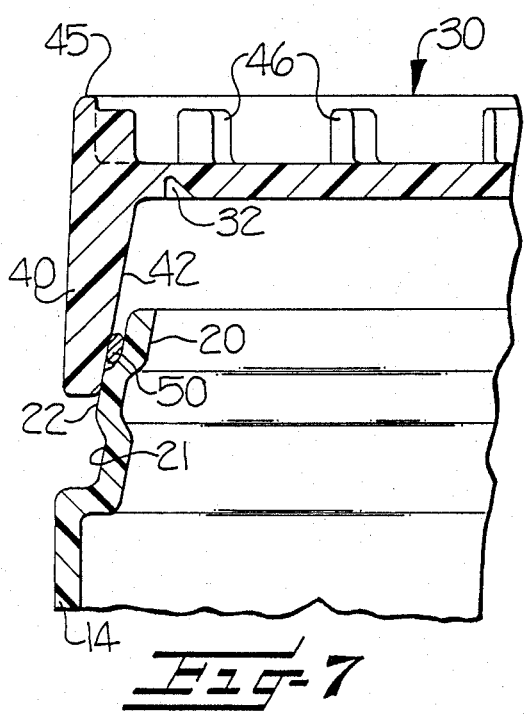
FIG. 7 is a view similar to FIG. 5 but illustrating a bead of hot melt material extending around and adjacent the upper portion of the inwardly tapering exterior surface of the open mouth portion of the can body.
Figure 8:
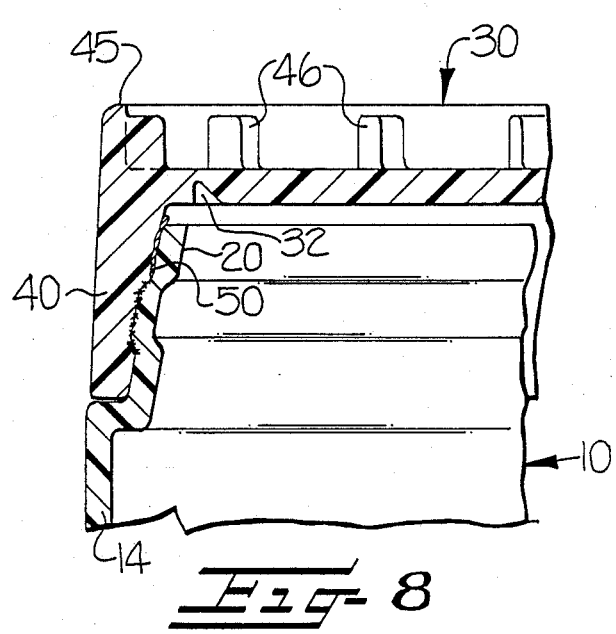
FIG. 8 is a view similar to FIG. 6 and showing the manner in which the hot melt material is disposed along the upper edge portion of the exterior surface of the open mouth portion of the can body when the plastic end closure member has been spin-bonded thereto.

The embodiment of FIGS. 7 and 8 is identical to the first embodiment of FIGS. 5 and 6, except that a bead of hot melt material, indicated at 50 in FIG. 7, is applied around the upstanding open mouth portion 20 and above the rib 22. The bead of hot melt material 50 can be of any suitable type, such as for example, Numel 612, distributed by Baychem International, Inc. The hot melt material 50 serves to prevent entry of any plastic dust or particles into the interior of the product filled can body 10. The plastic dust or particles are generated during the spin-bonding of the plastic end closure member 30 onto the open mouth portion 20, in a manner to be presently described.

The plastic end closure member 30 is spin-bonded and sealingly secured to the plastic open mouth portion 20 of the product filled can body 10 by providing relative rotation therebetween and while moving the end closure member 30 downwardly onto the open mouth portion 20 from the position shown in FIG. 5 to the position shown in FIG. 6. The apparatus for spin-bonding the end closure member 30 to the inwardly tapered upper mouth portion 20 of the can body 10 can be of the general type illustrated in FIGS. 5-7 of the aforementioned U.S. Pat. No. 4,402,451. However, the spin-bonding apparatus must be provided with a platform on which the bottom 12 of the can body 10 sits. The platform is provided with upstanding ribs to contact the vertical ribs 13 on the bottom of the can body 10 so as to prevent rotation of the can body 10 as the end closure member 30 is being rotatably engaged to the can body 10.

As the end closure member 30 is rotated at a high rate of speed, for example about 1,500 to 5,000 revolutions per minute (usually about 3,000 rpm), the interior outwardly tapering surface 42 of the rim 40 first contacts the integrally formed outwardly extending rib 22 of the open mouth portion 20 with spinning frictional engagement therebetween. As the end closure member 30 is rotated and lowered onto the open mouth portion 20, the frictional engagement creates heat sufficient to soften and bond or fuse the thermoplastic materials together. The outwardly extending rib 22 is heated and worn away so that it becomes bonded or fused to the interior outwardly tapering surface 42 of the rim 40. The rib 22 also wears away a portion of the interior surface 42 of the rim 40 so that spin-bond means, indicated by the curved line in FIG. 6 having X's spaced therealong, is formed along the outwardly tapering interior surface 42 of the rim 40 and the inwardly tapering exterior surface 21 of the open mouth portion 20.

It has been found that when the end closure member 30 is rotated and frictionally engages the outwardly extending rib 20, plastic particles and dust are formed and have a tendency to ride up the inclined open mouth portion 20 so that the plastic particles have a tendency to be deposited inside of the product filled can body 10 and may contaminate the contents thereof. When the all plastic can is to be used to store certain products, the presence of this plastic dust or particles is not objectionable. However, the presence of plastic dust or particles may be objectionable in certain instances.

In order to prevent the entry of plastic particles and dust into the interior of the can body 10, the bead of hot melt material 50 (FIG. 7) is applied to and extends around the upper portion of the open mouth portion 20 before the end closure member 30 is spin-bonded to the open mouth portion 20. This bead of hot melt material 50 acts as a "dam," or a trap, so that any plastic particles generated during the spin-bonding process will not be able to move upwardly and into the interior of the product filled can body 10. During the spin-bonding process, the bead of hot melt material 50 spreads out along the upper portion of the open mouth portion 20, in the manner shown in FIG. 8, and prevents any plastic particles or dust from moving upwardly and into the interior of the can body 10. However, the hot melt material 50 does not interfere with the spin-bonding of the surface areas therebelow, as indicated by the outwardly bowed curve line having X's spaced therealong (FIG. 8), so that spin-bonding and sealing takes place below the hot melt material 50.

The mating outwardly tapering interior surface 42 of the rim 40 and the inwardly tapering exterior surface 21 of the open mouth portion 20, supplemented by the rib 22, are ideally suited for spin-bonding. These two mating surfaces are subjected to spinning frictional engagement as the end closure member 30 is rotated at a high rate of speed and lowered into position on the open mouth portion 20 of the product filled can body 10 so that spin-bond means is provided to securely and sealingly connect the contiguous inwardly tapering exterior surface 21 of the open mouth portion 20 and the outwardly tapering interior surface 42 of the rim 40. The end closure member 30 is thus spin-bonded to the product filled can body in a tamper evident manner.

In the drawings and specification there has been set forth the best modes presently contemplated for the practice of the present invention, and although specific terms are employed, they are used in a generic and descriptive sense only and not for purposes of limitation, the scope of the invention being defined in the claims.

That which is claimed is:

1. A thermoplastic synthetic all plastic can comprising (a) a molded plastic can body including a cylindrical side wall portion, a closed bottom, and an open mouth portion extending upwardly from said cylindrical side wall portion and including an inwardly tapering exterior surface, said inwardly tapering exterior surface being inset inwardly from said cylindrical side wall.

(b) a molded plastic end closure member including a circular center panel portion closing the upper end of said can body, and an integrally formed rim portion extending downwardly from the peripheral portion of said circular center panel, said rim portion including a substantially cylindrical outer wall, and an outwardly tapering interior surface inclined to mate with said inset inwardly tapering exterior surface of said open mouth portion of said can body, said rim portion having a thickness corresponding with the distance said inwardly tapering exterior surface of said open mouth portion is inset from said cylindrical side wall, and (c) spin-bond means securing and sealingly connecting said mating surfaces of said inwardly tapering exterior surface of said open mouth portion and said outwardly tapering interior surface of said rim portion to securely bond said molded plastic end closure member to said mold plastic can body, and with said cylindrical side wall portion of said can body and said cylindrical outer wall of said end closure member in substantial alignment to thereby provide a smooth continuous appearance along the juncture of said can body and said end closure member.

2. An all plastic can according to claim 1 wherein said inwardly tapering exterior surface of said open mouth portion of said can body and the outwardly tapering interior surface of said rim of said end closure member extend at an angle of about five to fifteen degrees relative to said cylindrical side wall portion of said can body.

3. An all plastic can according to claim 1 wherein said inwardly tapering exterior surface of said open mouth portion includes an integrally formed outwardly extending rib adapted to be first engaged by said outwardly tapering interior surface of said rim portion of said end closure member, and wherein spinning frictional engagement between said interior surface of said rim and said exterior surface of said open mouth portion creates heat sufficient to soften and bond the contiguous thermoplastic materials.

4. An all plastic can according to claim 1 wherein the upper and lower end portions of said cylindrical side wall adjacent said open mouth portion and said closed bottom include respective upper and lower outwardly extending bumper ribs, said upper and lower bumper ribs defining a recessed exterior side wall surface to which identifying indicia may be applied, and wherein said upper and lower bumper ribs serve to engage corresponding upper and lower bumper ribs formed on adjacent cans packed in cases for shipment or the like and to prevent engagement and damage of the identifying indicia on adjacent cans.

5. An all plastic can according to claim 4 wherein said circular center panel portion of said plastic end closure member includes a circular frangible score line partially penetrating said circular center panel in a location closely adjacent said integrally formed rim portion, and an integrally molded pull tab fixed to said circular center panel and being operable to rupture along said circular score line for removing said circular center panel portion to provide a full opening in the upper end of said can, and wherein said bumper ribs also serve to prevent damage to said frangible score line.

6. An all plastic can according to claim 1 including an integrally formed rib extending outwardly from the central portion of said inwardly tapering exterior surface of said open mouth portion of said can body, and a bead of hot melt material extending around and above said rib of said open mouth portion, and wherein spinning frictional engagement between said interior surface of said rim and said exterior surface of said open mouth portion creates heat sufficient to soften and bond the contiguous thermoplastic materials while said bead of hot melt material prevents entry into the interior of said can body of any plastic dust particles generated by the spin-bonding of said plastic end closure member onto said open mouth portion of said plastic can body.

7. A thermoplastic synthetic all plastic can comprising (a) a product filled molded plastic can body including a cylindrical side wall portion, a closed bottom, and an open mouth portion extending upwardly from said cylindrical side wall portion and including an inwardly tapering exterior surface, (b) a molded plastic end closure member including a circular center panel portion closing the upper end of said can body, and an integrally formed rim portion extending downwardly from the peripheral portion of said circular center panel, said rim portion including an outwardly tapering interior surface inclined to mate with said inwardly tapering exterior surface of said open mouth portion of said can body, and (c) spin-bond means securing and sealingly connecting said mating surfaces of said inwardly tapering exterior surface of said open mouth portion and said outwardly tapering interior surface of said rim portion to securely bond said molded plastic end closure member to said molded plastic can body, and (d) a bead of hot melt material extending around and adjacent the upper portion of the inwardly tapering exterior surface of said open mouth portion, said bead of hot melt material being positioned and operable to prevent entry into the interior of said product filled can body of any plastic dust particles generated by the spin-bonding of said plastic end closure member onto said open mouth portion of said plastic can body.

* * * * *